(12) United States Patent
Meli et al.

(10) Patent No.: US 9,640,938 B2
(45) Date of Patent: May 2, 2017

(54) OPTICAL AMPLIFIER AND RELATED METHOD

(71) Applicant: PADTEC S.A., Campinas/SP (BR)

(72) Inventors: Fausto Meli, Piacenza (IT); Aldo Righetti, Milan (IT); Giorgio Grasso, Monza (IT)

(73) Assignee: PADTEC S.A., Campinas (BR)

( * ) Notice: Subject to any disclaimer, the term of this patent is extended or adjusted under 35 U.S.C. 154(b) by 80 days.

(21) Appl. No.: 14/703,145

(22) Filed: May 4, 2015

(65) Prior Publication Data

US 2015/0340832 A1 Nov. 26, 2015

(30) Foreign Application Priority Data

May 23, 2014 (EP) .................................... 14425061

(51) Int. Cl.
*H04B 10/291* (2013.01)
*H04B 10/294* (2013.01)
*H04J 14/02* (2006.01)
*H04Q 11/00* (2006.01)
*H01S 3/067* (2006.01)
*H01S 3/091* (2006.01)
*H01S 3/23* (2006.01)
*H01S 3/0941* (2006.01)
*H01S 3/13* (2006.01)
(Continued)

(52) U.S. Cl.
CPC ...... *H01S 3/06779* (2013.01); *H01S 3/06758* (2013.01); *H01S 3/091* (2013.01); *H01S 3/0941* (2013.01); *H01S 3/1301* (2013.01);

*H01S 3/2308* (2013.01); *H04B 10/294* (2013.01); *H04B 10/2912* (2013.01); *H04J 14/0221* (2013.01); *H04Q 11/0005* (2013.01); *H01S 3/0064* (2013.01); *H01S 3/094011* (2013.01); *H01S 3/094061* (2013.01); *H01S 2301/04* (2013.01); *H04Q 2011/0013* (2013.01); *H04Q 2011/0016* (2013.01)

(58) Field of Classification Search
None
See application file for complete search history.

(56) References Cited

U.S. PATENT DOCUMENTS 5,731,892 A * 3/1998 DiGiovanni ........ H01S 3/06758
359/337.3
5,867,300 A * 2/1999 Onaka ....................... G02F 1/09
324/244.1
6,011,645 A 1/2000 Hong
(Continued)

*Primary Examiner* — Darren E Wolf
(74) *Attorney, Agent, or Firm* — Pearne & Gordon LLP

(57) ABSTRACT

An optical amplifier (1), and a related optical amplification method, comprising an optical path (2) having an input end (3) and an output end (4), a first erbium doped optical fiber (5) placed along the optical path, a first gain flatting filter (6) placed along the optical path downstream the first erbium doped optical fiber, a second erbium doped optical fiber (7) placed along the optical path downstream the first gain flatting filter, a second gain flatting filter (8) placed along the optical path downstream the second erbium doped optical fiber, a third erbium doped optical fiber (9) placed along the optical path downstream the second gain flatting filter, and an optical pump (10) optically coupled to the optical path so as to optically pump at least the first and the third erbium doped optical fiber.

16 Claims, 10 Drawing Sheets

(51) Int. Cl.
*H01S 3/00* (2006.01)
*H01S 3/094* (2006.01)

(56) References Cited

U.S. PATENT DOCUMENTS

| | | | |
|---|---|---|---|
| 6,317,255 B1* | 11/2001 | Fatehi | H04B 10/071 359/341.44 |
| 2003/0039026 A1 | 2/2003 | Nishihara et al. | |
| 2003/0234976 A1 | 12/2003 | Nishihara et al. | |

* cited by examiner

OPTICAL AMPLIFIER AND RELATED METHOD

The present invention relates to the field of optical telecommunication, in particular it relates to an optical amplifier having a large bandwidth, i.e. greater than 40 nm, and a related method of optical amplification.

Optical amplifiers (OAs) are known which are based on Erbium-Doped Optical Fiber (EDF) and capable of optically amplifying a Wavelength Division Multiplexing (WDM) optical signal over the so-called Classic amplification band (C-band) having a bandwidth of about 35 nm (typically from about 1530 nm to about 1565 nm).

Large bandwidth optical amplifiers are known which are capable of optically amplifying WDM optical signal over at least part of the so-called Long band (L-band) (typically from about 1570 nm to about 1605 nm), in addition to at least part of the C-band, for a total amplification bandwidth greater than 40 nm.

The ensuing total amplification band (which may be continuous or separate in two or more sub-bands, typically one sub-band within the C-band and one sub-band within the L-band) provides for very high transmission capacity of the optical communication systems incorporating the OAs, for example being possible a WDM signal comprising up to 160 channels at a channel spacing of 50 GHz, each WDM channel having a bit rate of, for example, 100 Gb/s or higher.

Large bandwidth optical amplifiers are known based on a parallel scheme, wherein two EDF optical paths are placed in parallel configuration between two large bandwidth couplers, one EDF optical path being optimized for the C-band and the other for the L-band, independently one from the other.

The Applicant has found that these OAs based on parallel scheme (including their variants like double-pass OAs) are complex in terms of number of optical components, have larger total wavelength band occupancy (typically at least the band between about 1565 nm and 1570 nm is not usable for WDM channels), suffer from inter-band interference and need more monitoring channels.

Large bandwidth optical amplifiers are also known based on a series scheme having a single EDF optical path.

For example the article "C+L band EDFA with over 70 nm operating range", V. Sinivasagam, K. Dimyati, R. D. Singh, A. Mustafa—TENCON 2004, page 78-81, discloses a wideband silica-based EDFA design operating in both the C-band and the L-band region. The amplifier design is made of a dual stage, co-pumped at 980 nm.

The Applicant has found that prior art large bandwidth optical amplifiers suffer some drawbacks. For example according to the Applicant they show performance limits in terms of power conversion efficiency and/or spectral (i.e. over the whole amplification band) gain flatness and/or spectral Noise Figure and/or robustness of the spectral gain shape upon variation of the input power, in particular for saturated input power operation as happens when the WDM signal comprises a high number of WDM channels (i.e. more than about 30 channels).

The expression 'saturated operation' refers to OA operation wherein a (WDM) optical signal inputting the optical amplifier at its input end has a total optical power greater than the saturation input power, the latter being defined as the input power for which the total gain of the amplifier is 3 dB lower than the small-signal gain. Typically in saturated operation the (WDM) optical signal inputting the optical amplifier at its input end has a total optical power greater than −10 dBm.

The Power Conversion Efficiency is defined as the ratio between the total OA output power and the total pump power in saturated operation.

The spectral gain flatness is defined as the maximum variation of the spectral gain over the whole amplification band.

The Noise Figure is defined as the ratio (expressed in decibels) between the input Signal to Noise Ratio and the output Signal to Noise Ratio at each wavelength.

The robustness of the spectral gain shape upon variation of the input power, also herein referred to as spectral gain tilt (in dB/dB unit), may be defined as the absolute difference of the spectral gain in dB at the opposed ends of the whole amplification band per dB of variation of the total input signal power with respect to the optimal input signal power (wherein the spectral gain is flat).

It is an aim of the present invention to provide an optical amplifier suitable for overcoming one or more of the disadvantages of the prior art large bandwidth OAs.

In one aspect the present invention relates to an optical amplifier comprising an optical path having an input end and an output end, a direction of propagation for an optical signal being defined which goes from the input end to the output end, a first erbium doped optical fiber placed along the optical path, a first gain flatting filter placed along the optical path downstream the first erbium doped optical fiber, a second erbium doped optical fiber placed along the optical path downstream the first gain flatting filter, a second gain flatting filter placed along the optical path downstream the second erbium doped optical fiber, a third erbium doped optical fiber placed along the optical path downstream the second gain flatting filter, and an optical pump optically coupled to the optical path so as to optically pump at least the first and the third erbium doped optical fiber.

According to the Applicant, the scheme comprising a cascade of the first, second and third EDF and of the first and second Gain Flatting Filter (GFF), at least the first and third EDF being optically pumped, has proven to provide in a very flexible way (the specific characteristics depending upon the actual amplification band, the total input power and/or the target total gain) good performances in terms of spectral noise figure and/or spectral gain flatness and/or power conversion efficiency and/or robustness to change in total input signal power.

In the present description and claims, the expressions such as 'downstream', 'upstream', 'input end', 'output end' or the like are used with reference to said direction of propagation.

It is defined a first wavelength comprised between 1555 nm and 1565 nm, a second wavelength comprised between 1535 nm and 1545 nm and a third wavelength comprised between 1575 nm and 1585 nm. Preferably the first wavelength is equal to 1560 nm, the second wavelength is equal to 1540 nm and the third wavelength is equal to 1580 nm.

Typically, each of the first and second gain flattening filters has a spectral loss curve having at the first wavelength a first value of loss, at the second wavelength a second value of loss and at the third wavelength a third value of loss.

Preferably the first loss of the first gain flattening filter is greater than, or equal to, −16 dB, more preferably greater than, or equal to, −14 dB, and/or smaller than, or equal to, −8 dB, more preferably smaller than, or equal to, −10 dB.

Preferably the second and/or the third loss of the first gain flattening filter is greater than, or equal to, −8 dB, more preferably greater than, or equal to, −6 dB, and/or smaller than, or equal to, −1 dB.

Preferably the difference in dB between the second and the third loss of the first gain flattening filter is, in absolute value, smaller than, or equal to, 6 dB, more preferably smaller than, or equal to, 4 dB.

Preferably the spectral loss curve of the first GFF and/or of the second GFF has an absolute minimum between 1555 nm and 1565 nm.

Preferably the first loss of the second gain flattening filter is greater than, or equal to, −10 dB, more preferably greater than, or equal to, −8 dB, and/or smaller than, or equal to, −3 dB, more preferably smaller than, or equal to, −5 dB.

Preferably the second and/or the third loss of the second gain flattening filter is greater than, or equal to, −6 dB, more preferably greater than, or equal to, −4 dB, and/or smaller than, or equal to, −0.5 dB.

Preferably the difference in dB between the second and the third loss of the second gain flattening filter is, in absolute value, smaller than, or equal to, 4 dB, more preferably smaller than, or equal to, 3 dB.

According to the Applicant the above characteristics of the spectral loss curve(s), taken alone or variously combined, provide, in operation, excellent performances in terms of spectral noise figure and/or spectral gain flatness and/or power conversion efficiency and/or robustness to change in total input power, as explained in more details below.

Preferably the first erbium doped optical fiber has a total absorption loss at 1530 nm (i.e. the cumulative loss at 1530 nm considering the whole length of the fiber, the total absorption loss being related to the cumulative content of erbium along the whole length of the fiber, which in turn is related to the amplification capacity once the fiber is optically pumped) greater than or equal to 100 dB, more preferably greater than or equal to 120 dB, and/or smaller than, or equal to, 180 dB, more preferably smaller than, or equal to, 160 dB.

Preferably the second erbium doped optical fiber has a total absorption loss at 1530 nm greater than or equal to 10 dB, more preferably greater than or equal to 15 dB, and/or smaller than, or equal to, 40 dB, more preferably smaller than, or equal to, 35 dB.

Preferably the third erbium doped optical fiber has a total absorption loss at 1530 nm greater than or equal to 20 dB, more preferably greater than or equal to 30 dB, and/or smaller than, or equal to, 70 dB, more preferably smaller than, or equal to, 60 dB.

Preferably the first and/or second and/or third erbium doped optical fiber has/have an absorption at 1530 nm (which is related to the degree of erbium doping) greater than or equal to 5 dB/m.

Preferably the first erbium doped optical fiber has a length greater than, or equal to, 5 m, more preferably greater than, or equal to, 7 m, and/or smaller than, or equal to, 30 m, more preferably smaller than, or equal to, 25 m.

Preferably the second erbium doped optical fiber has a length greater than, or equal to, 1 m, more preferably greater than, or equal to, 2 m, and/or smaller than, or equal to, 10 m, more preferably smaller than, or equal to, 8 m.

Preferably the third erbium doped optical fiber has a length greater than, or equal to, 2 m, more preferably greater than, or equal to, 3 m, and/or smaller than, or equal to, 12 m, more preferably smaller than, or equal to, 10 m.

According to the Applicant the above characteristics of the erbium doped optical fiber(s), taken alone or variously combined, provide, in operation, in particular in saturated operation, optimal spectral gains. Advantageously the above characteristics of the erbium doped optical fiber(s), taken alone or variously combined, are optimally fitted to the above characteristics of the spectral loss curve(s) of the GFFs.

Preferably the optical pump comprises an optical source apt to emit an optical pump radiation at a pump wavelength, more preferably comprised between 970 nm and 990 nm.

Preferably the optical pump comprises a driver configured for (power) driving the optical source. Preferably the optical source and the driver are configured so that the emitted optical pump radiation has an optical power greater than, or equal to, 300 mW, more preferably greater than, or equal to, 400 mW, and/or smaller than, or equal to, 1000 mW, more preferably smaller than, or equal to, 800 mW.

Preferably the optical pump is configured for inputting the optical pump radiation into an input end of the first erbium doped optical fiber with an optical power greater than, or equal to, 200 mW, more preferably greater than, or equal to, 300 mW, and/or smaller than, or equal to, 700 mW, more preferably smaller than, or equal to, 500 mW.

Preferably the optical pump is configured for inputting the optical pump radiation into the first erbium doped optical fiber co-propagating with the direction of propagation.

Preferably the optical pump is configured for inputting the optical pump radiation into an output end of the third erbium doped optical fiber with an optical power greater than, or equal to, 50 mW, more preferably greater than, or equal to, 100 mW, and/or smaller than, or equal to, 400 mW, more preferably smaller than, or equal to, 300 mW.

Preferably the optical pump is configured for inputting the optical pump radiation into an output end of the second erbium doped optical fiber with an optical power smaller than, or equal to, 150 mW, more preferably smaller than, or equal to, 100 mW.

Preferably the optical pump is configured for inputting the optical pump radiation in the third and/or second erbium doped optical fiber counter-propagating with respect to the direction of propagation.

Preferably the optical pump comprises a first optical coupler placed along the optical path upstream the first erbium doped optical fiber and configured for coupling the optical source to the optical path so that the optical pump radiation is co-propagating with the direction of propagation.

Preferably the optical pump comprises a second optical coupler placed along the optical path downstream the third erbium doped optical fiber and configured for coupling the optical source to the optical path so that the optical pump radiation is counter-propagating to the direction of propagation.

Preferably the optical pump comprises an optical splitter having an input port optically connected to the optical source and a first and a second output port optically connected to respectively the first and the second optical coupler, so as to optically connect the optical source to both the first and the second optical coupler.

Preferably the optical source comprises two laser pumps in parallel configuration, more preferably both the laser pumps being connected to the input port of the optical splitter.

Preferably the optical splitter is configured so that at the pump wavelength the percentage of the optical power output from the first output port to the optical power input to the input port is greater than, or equal to 50%, more preferably greater than, or equal to, 60%, and/or smaller than, or equal to 90%, more preferably smaller than, or equal to, 80%.

According to the Applicant the above characteristics of the optical pump (more preferably in combination with the above features of the EDFs and/or the GFFs) provide optimal spectral gains and NF within the EDFs.

Preferably an optical isolator is placed along the optical path downstream the first erbium doped optical fiber and upstream the third erbium doped optical fiber.

Preferably the optical amplifier comprises a tap coupler placed along the optical path downstream the third optical fiber so as to tap, in operation, from the optical path a fraction of an optical power of a WDM signal comprised between 1% and 10% of the optical power of the WDM signal in the optical path and a receiver configured to receive said fraction of optical power, the receiver being connected to a control unit so as to send to the latter a control signal representative of said fraction of optical power.

Preferably the control unit is configured for driving the optical source in function of said control signal.

It is defined a first, second and third gain as the ratio of an optical signal power at an output end of, respectively, the first, second and third erbium doped optical fiber to an optical signal power at an input end of respectively, the first, second and third erbium doped optical fiber, in operation of the optical amplifier. Each of the first, second and third gain are a function of wavelength.

It is defined a reference WDM optical signal having a number of channels comprised between 80 and 200 channels (e.g. 160 channels) equally spaced (e.g. by 50 GHz) within a continuous WDM band having bandwidth comprised between 40 nm and 70 nm and comprising the wavelengths of 1540 nm and 1580 nm (e.g. starting from 1533 nm), all the channels having substantially the same optical power.

Preferably the first, second and third erbium doped optical fiber and the optical pump are configured so that, when the reference WDM signal is input to the input end of the optical amplifier with a total input power of 5 dBm (i.e. in saturated operation of the optical amplifier), the first gain at the first wavelength is greater than, or equal to, 16 dB, more preferably greater than, or equal to, 18 dB, and/or smaller than 30 dB, more preferably smaller than, or equal to, 26 dB.

Preferably the first, second and third erbium doped optical fiber and the optical pump are configured so that, when the reference WDM signal is input to the input end of the optical amplifier with a total input power of 5 dBm, the first gain at the second and/or third wavelength is greater than, or equal to, 6 dB, more preferably greater than, or equal to, 8 dB, and/or smaller than 18 dB, more preferably smaller than, or equal to, 16 dB.

Preferably the first, second and third erbium doped optical fiber and the optical pump are configured so that, when the reference WDM signal is input to the input end of the optical amplifier with a total input power of 5 dBm, the difference in dB between the first gain at the second and third wavelength is, in absolute value, smaller than or equal to 6 dB, more preferably smaller than, or equal to, 4 dB.

Preferably the first, second and third erbium doped optical fiber and the optical pump are configured so that, when the reference WDM signal is input to the input end of the optical amplifier with a total input power of 5 dBm, the difference in dB between the first gain at the first wavelength and the first gain at the second and/or at the third wavelength is greater than or equal to 5 dB, more preferably greater than, or equal to, 7 dB.

Preferably the first, second and third erbium doped optical fiber and the optical pump are configured so that, when the reference WDM signal is input to the input end of the optical amplifier with a total input power of 5 dBm, the second gain at the second wavelength is smaller than 0 dB, and the second gain at the first and third wavelength is greater than 0 dB.

Preferably the first, second and third erbium doped optical fiber and the optical pump are configured so that, when the reference WDM signal is input to the input end of the optical amplifier with a total input power of 5 dBm, the second gain at the first, second and third wavelength is smaller, in absolute value, than 4 dB, more preferably smaller than, or equal to, 3 dB, even more preferably smaller than, or equal to, 2 dB.

Preferably the first, second and third erbium doped optical fiber and the optical pump are configured so that, when the reference WDM signal is input to the input end of the optical amplifier with a total input power of 5 dBm, the third gain at the first and second wavelength is greater than, or equal to, 4 dB, more preferably greater than, or equal to, 5 dB, and/or smaller than, or equal to 14 db, more preferably smaller than, or equal to, 12 dB.

Preferably the first, second and third erbium doped optical fiber and the optical pump are configured so that, when the reference WDM signal is input to the input end of the optical amplifier with a total input power of 5 dBm, the third gain at the third wavelength is greater than, or equal to, 0 dB, more preferably greater than, or equal to, 1 dB, and/or smaller than, or equal to 9 db, more preferably smaller than, or equal to, 7 dB.

Preferably the first, second and third erbium doped optical fiber and the optical pump are configured so that, when the reference WDM signal is input to the input end of the optical amplifier with a total input power of 5 dBm, the difference, in dB, of the third gain at the first and second wavelength is smaller, in absolute value, than 3 dB, more preferably smaller than, or equal to 2 dB.

In a further aspect, the present invention relates to a WDM optical communication system comprising an optical fiber communication link comprising therealong at least one (typically a plurality of) optical amplifier/s according to the above, a WDM transmitter structured for generating and launching into the optical fiber communication link with said direction of propagation the WDM optical signal, and a WDM receiver structured for receiving and processing the WDM optical signal coming from the optical fiber communication link.

Preferably the WDM optical communication system is a submarine optical communication system.

In a further aspect, the present invention relates to a method for optically amplifying a WDM optical signal comprising inputting the WDM optical signal into the input end of an optical amplifier according to any of the embodiments herein described, sending by the optical pump an optical pump radiation into the optical path so as to optically pump at least the first and the third erbium doped optical fiber and therein amplify the WDM signal, and outputting the amplified WDM optical signal from the output end of the optical amplifier.

Preferably the WDM optical signal comprises a plurality of optical signal channels having spaced wavelengths, more preferably equally spaced by a WDM spacing, the difference, in nm, between the highest and the lowest wavelength of the WDM optical signal being greater than 40 nm, more preferably greater than or equal to 50 nm.

Preferably the highest and the lowest wavelength of the WDM optical signal are at opposite sides of the wavelength of 1565 nm.

Preferably the lowest wavelength is greater than, or equal to, 1500 nm, more preferably greater than, or equal to, 1510 nm, even more preferably greater than, or equal to, 1520 nm and/or smaller than, or equal to 1550 nm, more preferably smaller than or equal to 1540.

Preferably the highest wavelength is greater than, or equal to, 1580, more preferably greater than, or equal to, 1590 nm, and/or smaller than, or equal to 1620 nm, more preferably smaller than or equal to 1610 nm.

Preferably the WDM spacing is less than or equal to 200 GHz, more preferably less than or equal to 150 GHZ, for example 100 GHz or 50 GHz. Preferably the WDM optical signal has at least 30 channels, more preferably at least 40 channels. Preferably each channel has a bit rate of at least 2.5 Gb/s, more preferably at least 10 Gb/s.

Preferably the optical pump radiation emitted by the optical source has an optical power greater than, or equal to, 300 mW, more preferably greater than, or equal to, 400 mW, and/or smaller than, or equal to, 1000 mW, more preferably smaller than, or equal to, 800 mW.

Preferably the optical pump radiation has an optical power in (at least a point of, more preferably at the input end of) the first erbium doped optical fiber greater than, or equal to, 200 mW, more preferably greater than, or equal to, 300 mW, and/or smaller than, or equal to, 700 mW, more preferably smaller than, or equal to, 500 mW.

Preferably the optical pump radiation is co-propagating with the WDM optical signal according to the direction of propagation in the first erbium doped optical fiber.

Preferably the optical pump radiation has an optical power in (at least a point of, more preferably at the output end of) the third erbium doped optical fiber greater than, or equal to, 50 mW, more preferably greater than, or equal to, 100 mW, and/or smaller than, or equal to, 400 mW, more preferably smaller than, or equal to, 300 mW.

Preferably the optical pump radiation has an optical power in (at least a point of, more preferably at the output end of) the second erbium doped optical fiber smaller than, or equal to, 150 mW, more preferably smaller than, or equal to, 100 mW.

Preferably the optical pump radiation is counter-propagating with respect to the WDM optical signal in the third and/or second erbium doped optical fiber.

Preferably the total optical power of the WDM optical signal at the input end of the optical amplifier is greater than, or equal to, 0 dBm, more preferably greater than, or equal to, 2 dBm, and/or smaller than, or equal to, 10 dBm, more preferably smaller than, or equal to, 8 dBm.

Preferably the total optical power of the WDM optical signal at the output end of the optical amplifier is greater than, or equal to, 14 dBm, more preferably greater than, or equal to, 16 dBm, and/or smaller than, or equal to, 26 dBm, more preferably smaller than, or equal to, 22 dBm.

Preferably the first gain at the first wavelength is greater than, or equal to, 16 dB, more preferably greater than, or equal to, 18 dB, and/or smaller than 30 dB, more preferably smaller than, or equal to, 26 dB.

Preferably the first gain at the second and/or third wavelength is greater than, or equal to, 6 dB, more preferably greater than, or equal to, 8 dB, and/or smaller than 18 dB, more preferably smaller than, or equal to, 16 dB.

Preferably the difference in dB between the first gain at the second and third wavelength is, in absolute value, smaller than or equal to 6 dB, more preferably smaller than, or equal to, 4 dB.

Preferably the difference in dB between the first gain at the first wavelength and the first gain at the second and/or at the third wavelength is greater than or equal to 5 dB, more preferably greater than, or equal to, 7 dB.

Preferably the second gain at the second wavelength is smaller than 0 dB, and the second gain at the first and third wavelength is greater than 0 dB.

Preferably the second gain at the first, second and third wavelength is smaller, in absolute value, than 4 dB, more preferably smaller than, or equal to, 3 dB, even more preferably smaller than, or equal to, 2 dB.

Preferably the third gain at the first and second wavelength is greater than, or equal to, 4 dB, more preferably greater than, or equal to, 5 dB, and/or smaller than, or equal to 14 db, more preferably smaller than, or equal to, 12 dB.

Preferably the third gain at the third wavelength is greater than, or equal to, 0 dB, more preferably greater than, or equal to, 1 dB, and/or smaller than, or equal to 9 db, more preferably smaller than, or equal to, 7 dB.

Preferably the difference, in dB, of the third gain at the first and second wavelength is smaller, in absolute value, than 3 dB, more preferably smaller than, or equal to 2 dB.

Further aspects of the present invention are set forth in the appended claims.

Further characteristics and advantages will be more evident from the detailed description of some exemplary, though not exclusive, embodiments of an optical amplifier and a related method, in accordance with the present invention. This description will be disclosed below with reference to the accompanying drawings, provided to a merely indicative and therefore non-limiting purpose, in which.

Figure 1:
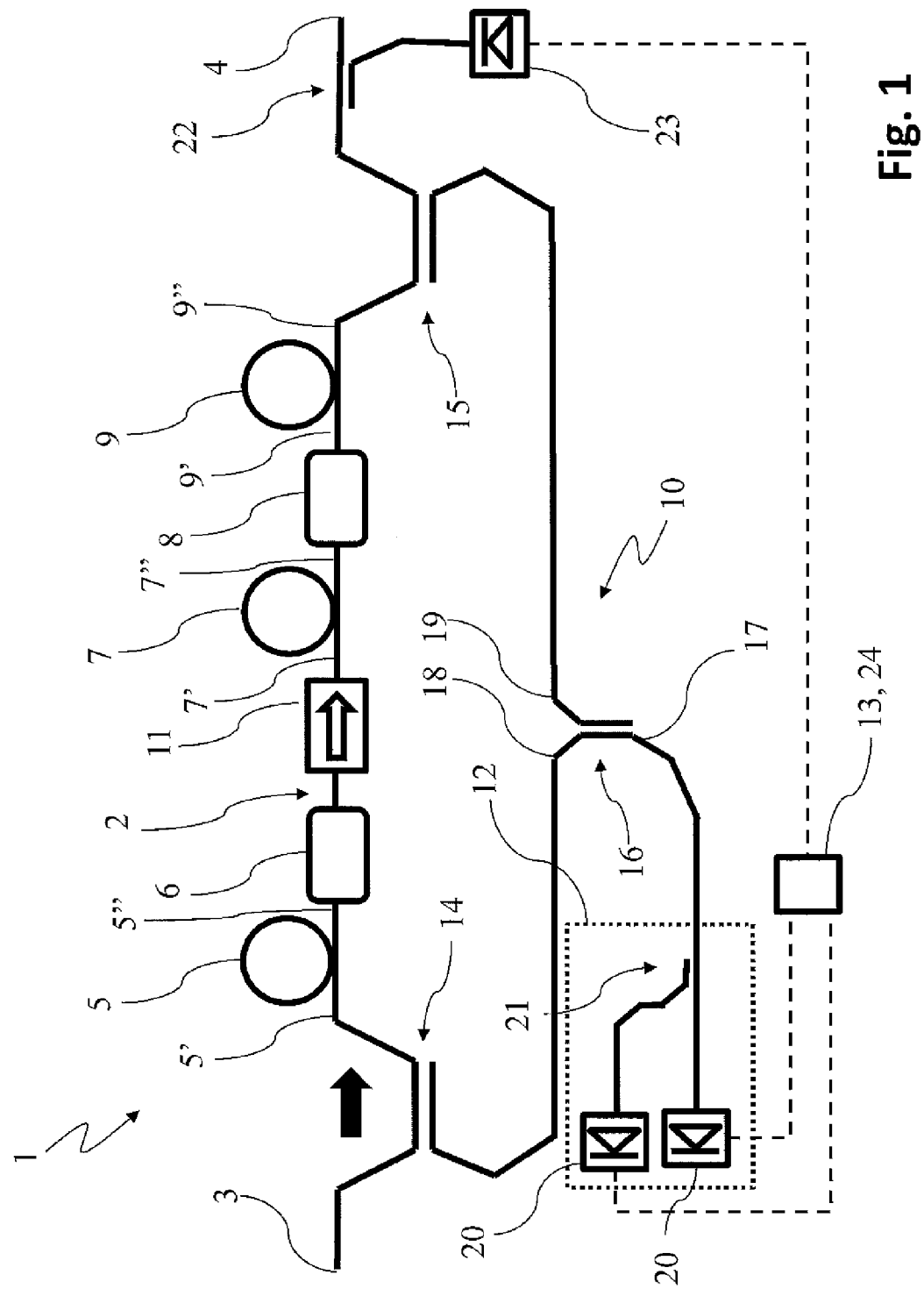
FIG. 1 shows in terms of logical blocks a schematic diagram of an embodiment of the optical amplifier in accordance with the present invention.

With reference to FIG. 1, an optical amplifier in accordance to the present invention is generally indicated with the numeral reference 1.

The optical amplifier 1 comprises an optical path 2 having an input end 3 and an output end 4, a direction of propagation (indicated by a solid arrow in FIG. 1) for an optical signal being defined which goes from the input end to the output end, a first erbium doped optical fiber 5 placed along the optical path, a first gain flatting filter 6 placed along the optical path downstream the first erbium doped optical fiber, a second erbium doped optical fiber 7 placed along the optical path downstream the first gain flatting filter 6, a second gain flatting filter 8 placed along the optical path downstream the second erbium doped optical fiber 7, a third erbium doped optical fiber 9 placed along the optical path downstream the second gain flatting filter 8, and an optical pump 10 optically coupled to the optical path so as to optically pump at least the first and the third erbium doped optical fiber.

Exemplarily the first, second and third EDF 5, 7 and 9 are commercially available Corning™ ER1550C3 fibers having a peak absorption around 1530 nm of 8.352 dB/m.

Exemplarily the first and second and third EDF are respectively 17 m, 3 m and 5 m long.

However, the Applicant has ascertained that the advantages of the present invention can be achieved with different types of EDF, for example having different lengths and/or different levels of erbium doping (expressed for example by the loss absorption at 1530 nm). In general the skilled person may select a proper combination of level of erbium (and/or other rare-earth(s)) doping and fiber lengths in order to achieve one or more advantages of the present invention, for example by matching the total absorption loss at 1530 nm to the ranges given above.

Exemplarily the total (i.e. the cumulative loss considering the whole length of the fiber) absorption loss at 1530 nm of the first 5, second 7 and third EDF 9 is equal to respectively 142 dB, 25 dB and 42 dB.

Preferably an optical isolator 11 is placed along the optical path downstream the first erbium doped optical fiber and upstream the third erbium doped optical fiber, typically downstream the first GFF 6 and upstream the second EDF 7. The optical isolator is apt to allow propagation of the optical signal only according to the direction of propagation.

Preferably the optical pump 10 comprises an optical source 12 apt to emit an optical pump radiation at a pump wavelength, exemplarily at about 980 nm.

Preferably the optical pump 10 comprises a driver 13 electrically connected to the optical source and configured for power driving the optical source. Power lines are indicated by dashed lines in the figures.

Preferably the optical pump 10 comprises a first optical coupler 14 placed along the optical path 2 upstream the first EDF 5 and configured for coupling the optical source 12 to the optical path so that the optical pump radiation is co-propagating with the direction of propagation in the first EDF.

Preferably the optical pump 10 comprises a second optical coupler 15 placed along the optical path 2 downstream the third EDF and configured for coupling the optical source to the optical path so that the optical pump radiation is counter-propagating to the direction of propagation in the third EDF 9.

Preferably the optical pump 10 comprises an optical splitter 16 having an input port 17 optically connected to the optical source 12 and a first 18 and a second output port 19 optically connected to respectively the first 14 and the second optical coupler 15, so as to optically connect the optical source 12 to both the first and the second optical coupler.

Preferably the optical source 12 comprises two laser pumps 20 in parallel configuration, more preferably both the laser pumps being connected to the input port 17 of the optical splitter 16 through a further optical coupler 21.

Exemplarily the optical splitter 16 is configured so that at the pump wavelength the percentage of the optical power output from the first output port 18 to the optical power input to the input port 17 is equal to about 70%.

Preferably the optical amplifier 1 comprises a tap coupler 22 placed along the optical path downstream the third EDF 9 so as to tap, in operation, from the optical path 2 a fraction of an optical power of a WDM signal exemplarily equal to 5% of the optical power of the WDM signal in the optical path and a receiver 23 configured to receive said fraction of optical power, the receiver being connected (e.g. through a power line, in dashed line in the figures) to a control unit 24 so as to send to the latter a control signal representative of said fraction of optical power. Exemplarily and preferably the driver 13 and the control unit 24 are integrated in the same processing device as shown in the figures.

Preferably the control unit 24 is configured for driving the optical source in function of said control signal.

Preferably the optical couplers are directional optical couplers (such as those schematically depicted in FIGS. 1 and 2) each one formed by a pair of optical fiber segments closely spaced together.

The amplifier can be implemented with erbium doped fiber (EDFs) or other rare earth doped fiber, possibly in combination with Raman amplification and/or semiconductor optical amplifiers.

The term "optically connected" as used herein refers to any connection, coupling, link or the like by which optical radiation carried by one system element are imparted to the "connected" element or elements. Unless otherwise stated, such "connected" devices are not necessarily directly connected to one another and may be separated by intermediate components or devices that may manipulate or modify such signals.

In operation, a WDM optical signal is input into the input end 3 of the optical amplifier 1 and made to propagate along the optical path 2 with the above defined direction of propagation.

Meanwhile, an optical pump radiation (e.g. at about 980 nm wavelength) emitted by the optical source 12 is input into the optical path 2 so as to excite Erbium in the EDFs 5 and 9, and, preferably, at a lesser extent in the EDF 7. Preferably the optical pump radiation is co-propagating with the WDM optical signal according to the direction of propagation in the first EDF 5 and counter-propagating in the third, and possibly the second, EDF.

The WDM optical signal then undergoes optical amplification in the first 5, second 7 and third 9 EDF with a respective spectral gain and undergoes a shaping of its spectral power in the first 6 and second 8 GFF.

The amplified WDM optical signal is finally output from the output end 4 of the optical amplifier 1.

Figure 2:
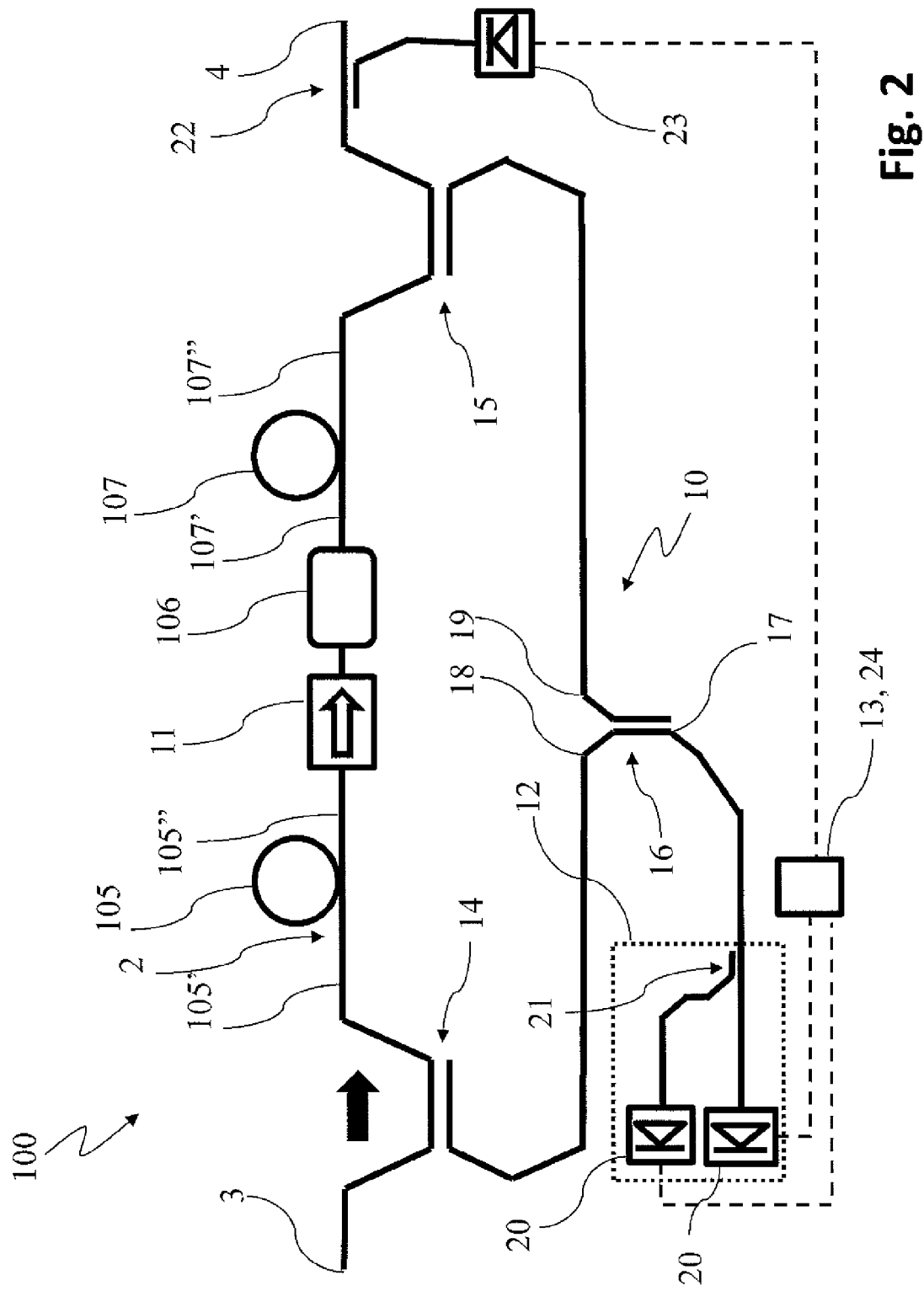
FIG. 2 shows in terms of logical blocks a schematic diagram of a comparative optical amplifier.

FIG. 2 schematically shows a comparative optical amplifier 100. Elements equal or similar to elements described with reference to FIG. 1 will be referred to with the same reference numeral.

The comparative optical amplifier 100 comprises a first EDF 105 placed along the optical path 2, a gain flatting filter 106 placed along the optical path downstream the first EDF 105 and a second EDF 107 placed along the optical path 2 downstream the GFF 106.

With respect to the optical amplifier 1, the comparative optical amplifier 100 does not comprise further EDF(s) and/or further GFF(s).

Exemplarily the first and second EDF 105 and 107 are commercially available Corning™ ER1550C3 fibers having a peak absorption around 1530 nm of 8.352 dB/m.

Exemplarily the first and second EDF 105 and 107 are respectively 17 m and 8 m long.

Exemplarily the total absorption loss at 1530 nm of the first EDF 105 and second EDF 107 is equal to respectively about 142 dB and 67 dB.

For comparison purposes, the optical pump 10 is taken identical to the one of the optical amplifier 1 of FIG. 1. In operation, the two EDF stages 105 and 107 are respectively co- and counter-pumped with a 980 nm optical source 12 divided through a 70/30 optical splitter 16 feeding two couplers 14 and 15 apt to combine the 980 nm optical pump radiation with the WDM optical signal.

Figure 3:
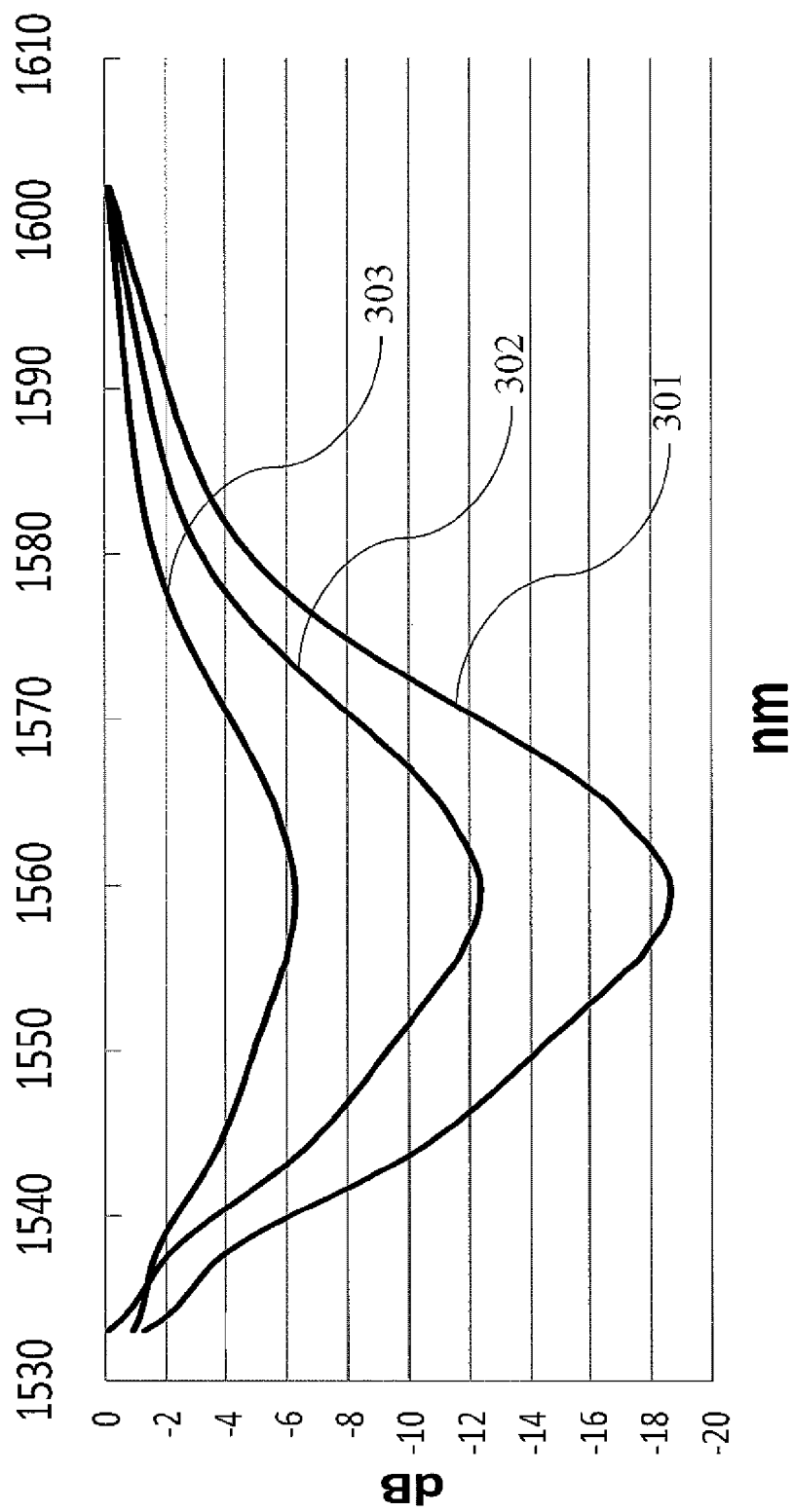
FIG. 3 shows exemplar spectral loss curves of gain flattening filters in the optical amplifiers of FIGS. 1 and 2.

FIG. 3 shows the exemplary spectral loss curve of GFF 106 of a first embodiment of the optical amplifier 100 (curve 301).

FIG. 3 also shows exemplary spectral loss curves of the first GFF 6 (curve 302) and the second GFF 8 (curve 303) of the first embodiment of the optical amplifier 1.

For all FIGS. 3 to 10 the horizontal axis represents the wavelength in nm. For FIGS. 3 and 8 the vertical axis represents the GFF loss in dB, the loss being defined as the ratio of the output signal power to the input signal power.

It is noted that taking as reference wavelengths a first wavelength equal to 1560 nm, a second wavelength equal to 1540 nm and a third wavelength equal to 1580 nm, in the first embodiment the first loss of GFF 106 of the comparative optical amplifier 100 is equal to about −18.8 dB, the first loss of the first GFF 6 of the optical amplifier 1 is equal to about −12.3 dB, and the first loss of the second GFF 8 of the optical amplifier 1 is equal to about −6.2 dB.

Exemplarily the second and the third loss of the first GFF 6 is equal to about −4 dB and −3 dB respectively, the difference between the second and the third loss (in dB) of the first GFF being about −1 dB.

Exemplarily the second and the third loss of the second GFF 8 is equal to about −2 dB.

Exemplarily the second and the third loss of the GFF 106 of the comparative optical amplifier 100 is equal to about −7 dB and −5 dB respectively.

The Applicant has conducted numerical (software) simulations on the respective first embodiment of the optical amplifier 1 of the present invention and of the comparative optical amplifier 100 above described with reference to FIGS. 1 to 3, in operation.

For comparison purposes, the WDM signal, the total input and output power of the WDM signal and the power of the optical pump 10 have been taken substantially equal for both the optical amplifier 1 and the comparative optical amplifier 100.

The EDFs of both the amplifiers 1 and 100 have been numerically modelled in the simulator by a numerical spectral model based on measured Giles parameters (spectral absorption coefficients, spectral gain coefficients, saturation fiber parameter, background losses at the pump and signal wavelengths) of commercially available Corning™ ER1550C3 fibers having a peak absorption around 1530 nm of 8.352 dB/m, as described above.

The length of the EDFs in the respective first embodiment of the two amplifiers 1 and 100 are those given exemplarily above.

The WDM optical signal (referred to as a first reference WDM signal) input in both the simulated optical amplifiers 1 and 100 has 160 channels with equal optical power and equally spaced by 53.4 GHz over a WDM band spanning from 1533.07 nm (lowest wavelength) to 1602.2 nm (highest wavelength), for a total continuous band about 69.1 nm wide. It is noted that in the real WDM communication systems the WDM spacing is typically rounded to 50 GHz. The choice of the above value is that in this way the simulated reference WDM optical signal spans the same band that would be occupied by a real WDM signal comprising 160 channels equally spaced by 50 GHz, plus the band occupied by the monitoring channels (such as the OTDR monitoring channels). Typically, in fact, two monitoring channels are allocated on both sides of the WDM signal at a certain distance (e.g. at least 2 nm) from the lowest and highest wavelengths of the WDM signal. The Applicant thinks, to the best of his knowledge, that the numerical results for the reference WDM signal are substantially the same as for a real WDM signal comprising 160 channels spaced by 50 GHz plus the two monitoring channels, provided that the total input and output power are the same.

The total optical power of the first reference WDM signal at the input end 3 of both the optical amplifiers 1 and 100 was taken equal to 5 dBm (saturated operation).

The total optical power of the first reference WDM signal at the output end 4 of the optical amplifiers 1 and 100 was equal to about 18.85 dBm and 19 dBm respectively.

For both amplifiers 1 and 100 the optical power of the optical pump radiation emitted by the optical source 12 was taken equal to 600 mW. With a splitting ratio of the splitter 16 in the first 18 and second output port 19 of 70/30, and taking into account the typical loss of the optical components (e.g. loss of isolator 11: 0.4 dB, added loss of the splitter 16 (70/30): 0.4 dB, loss of each WDM coupler 14 and 15: 0.3 dB at 980 nm and 0.4 dB at 1550 nm, added loss of splitter 22 (95/5): 0.4 dB) and the splice losses (0.1 dB for each splice loss) this results in an optical power of the optical pump radiation at an input end 5' of the first EDF 5 equal to 357 mW, at an output end 9" of the third EDF 9 equal to 153 mW and at an output end 7" of the second EDF 7 equal to 21 mW (substantially equal to the optical power of the optical pump radiation at an input end 9' of the third EDF 9, since the pump attenuation of the GFF 8 is negligible).

By comparison, the optical power of the optical pump radiation at the input end 105' of the first EDF 105 of the optical amplifier 100 is equal to 357 mW and at the output end 107" of the second EDF 107 is equal to 153 mW.

FIGS. 4 to 7 show the simulated results under the above conditions for the first embodiment of both the optical amplifiers 1 and 100. It is noted that while the simulation is conducted on a discrete number of channels, the continuous spectral gain and noise figure curves are obtained by interpolation of the discrete values. This is the reason why the reference signal can be taken arbitrarily within the boundaries given above (between 80 and 200 power-equalized WDM channels equally spaced within a continuous band having bandwidth comprised between 40 nm and 70 nm and comprising the wavelengths of 1540 nm and 1580 nm), for the purpose of assessing the OA performances.

Figure 4:
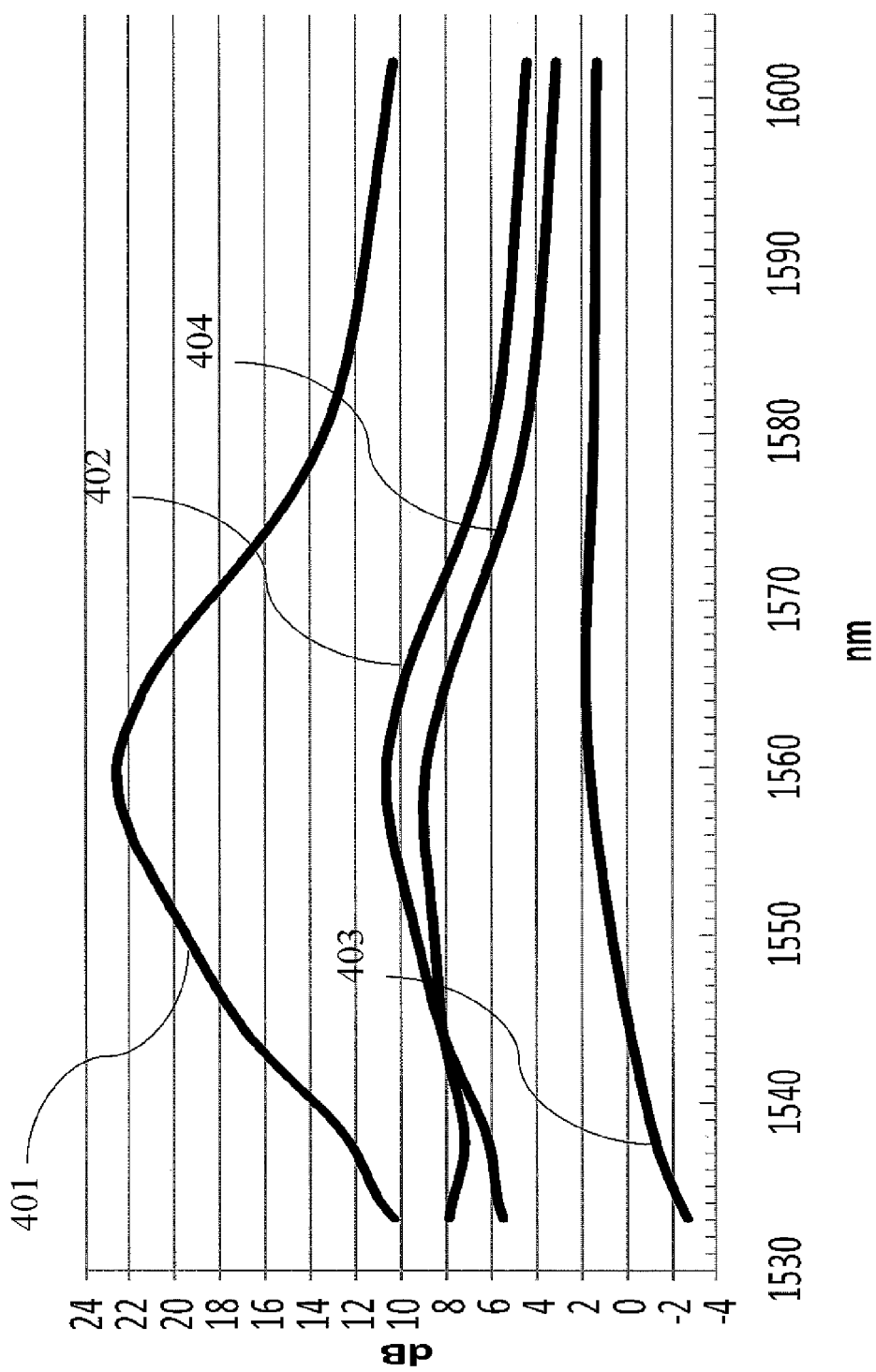
FIG. 4 shows exemplar gain curves in the erbium doped optical fibers of the optical amplifier of FIGS. 1 and 2.

Curve 401 of FIG. 4 shows the spectral gain curve within the WDM band experienced by the WDM reference signal along the first EDF 5 of the optical amplifier 1 and the first EDF 105 of the comparative optical amplifier 100, the two spectral gain curves being substantially equal. The gain (referred to as 'first gain' curve) along the first EDF 5 of the optical amplifier 1 is defined at each wavelength as the ratio of the optical signal power at an output end 5" of the first EDF 5 to the optical signal power at an input end 5' of the first EDF 5.

Analogously the gain along the first EDF 105 of the comparative optical amplifier 100 is defined at each wavelength as the ratio of the optical signal power at an output end 105" of the first EDF 105 to the optical signal power at an input end 105' of the first EDF 105. It can be seen that for both amplifiers the first gain has a peak at about the first wavelength of 1560 nm at a value equal to about 22.5 dB and that the first gain at both the second wavelength of 1540 nm and the third wavelength of 1580 nm is equal to about 14 dB, the difference in dB between the first gain at the first wavelength and the first gain at the second and at the third wavelength being equal to about 8.5 dB. The first GFF 6 has a spectral loss (curve 302 of FIG. 3) that equalizes the first gain (curve 401) maintaining advantageously a final spectral gain around 10 dB.

Curve 402 of FIG. 4 shows the spectral gain curve within the WDM band experienced by the WDM reference signal along the second EDF 107 of the comparative optical amplifier 100, defined at each wavelength as the ratio of the optical signal power at an output end 107" of the second EDF 107 to the optical signal power at an input end 107' of the second EDF 107.

Curve 403 of FIG. 4 shows the spectral gain curve (referred to as 'second gain' curve) within the WDM band experienced by the WDM reference signal along the second EDF 7 of the optical amplifier 1, defined at each wavelength as the ratio of the optical power at an output end 7" of the second EDF 7 to the optical power at an input end 7' of the second EDF 7. It is noted that the second gain at the second wavelength is equal to about −1 dB and that the second gain at the first and third wavelength is equal to about 1.5 dB.

The Applicant thinks that this sort of high-pass spectral gain may be related to an effect of the C-band pumping the L-band, the residual pump radiation in the second EDF 7 coming from the third EDF 9 being such that the lower range of the C-band, that is partially depleted, results slightly attenuated.

Curve 404 of FIG. 4 shows the spectral gain curve (referred to as 'third gain' curve) within the WDM band experienced by the WDM reference signal along the third EDF 9 of the optical amplifier 1, defined at each wavelength as the ratio of the optical signal power at an output end 9" of the third EDF 9 to the optical signal power at an input end 9' of the third EDF 9. It can be noted that the third gain at the first and second wavelength is equal to about 9 dB and about 7.5 dB respectively, that the third gain at the third wavelength is equal to about 4.5 dB and that the difference of the third gain at the first and second wavelength is equal to about 1.5 dB. It is noted that the spectral loss (curve 303) of the second GFF 8 is apt to equalize the gain of the 2nd and 3rd EDF. It is also noted that the third spectral gain favours the amplification in the C-band reducing the contribution in the L-band.

Figure 6:
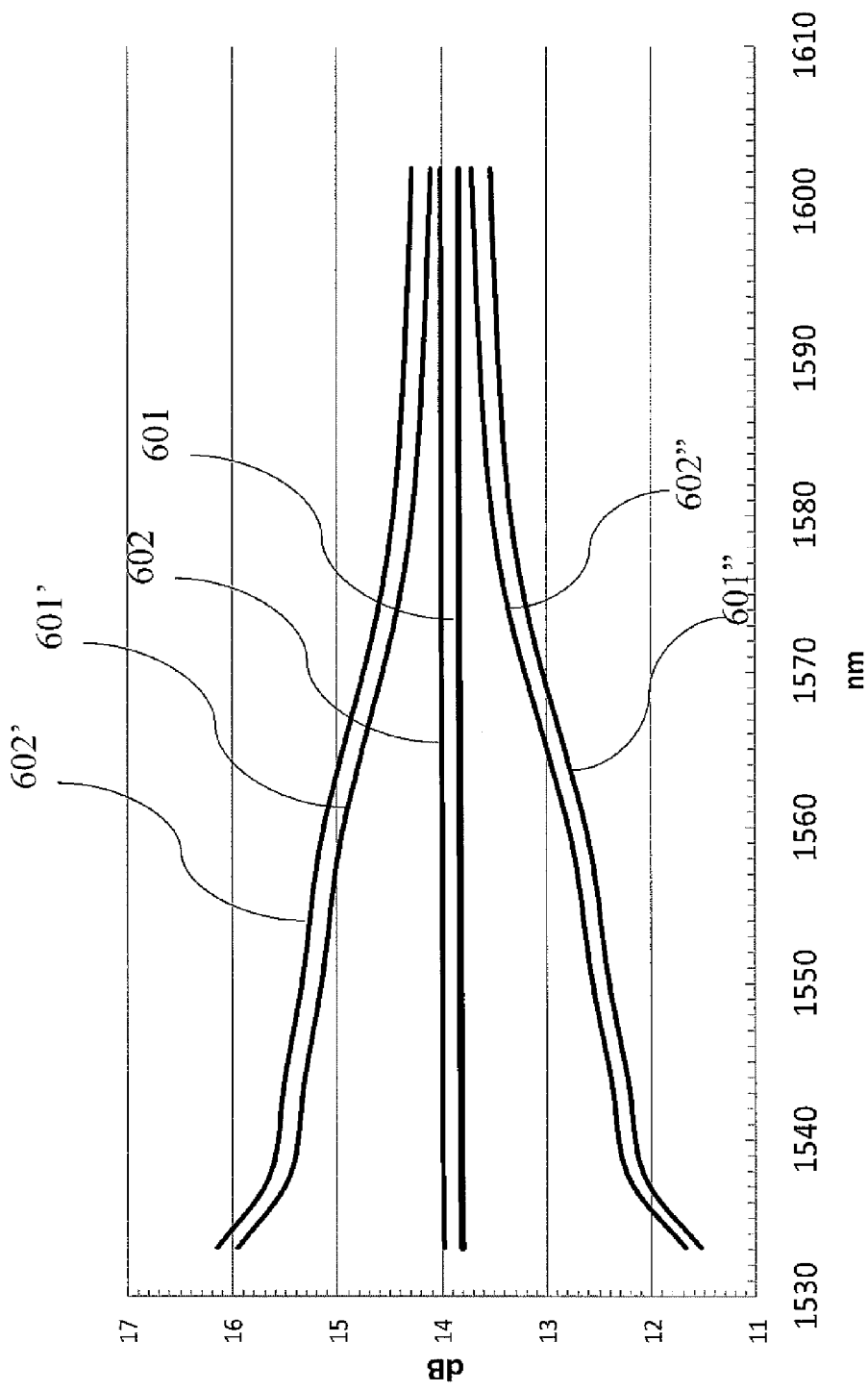
FIG. 6 shows exemplar total Gain curves of the optical amplifiers of FIGS. 1 and 2.

With reference to FIG. 6, curves 601 and 602 show the respective total spectral gain curve within the WDM band experienced by the WDM reference signal along respectively the optical amplifier 1 and the comparative optical amplifier 100, defined at each wavelength as the ratio of the optical signal power at an output end 4 of the optical amplifier to the optical signal power at an input end 3 of the same, the two spectral gain curves being substantially equal. It can be noted the flatness of the gain.

Figure 5:
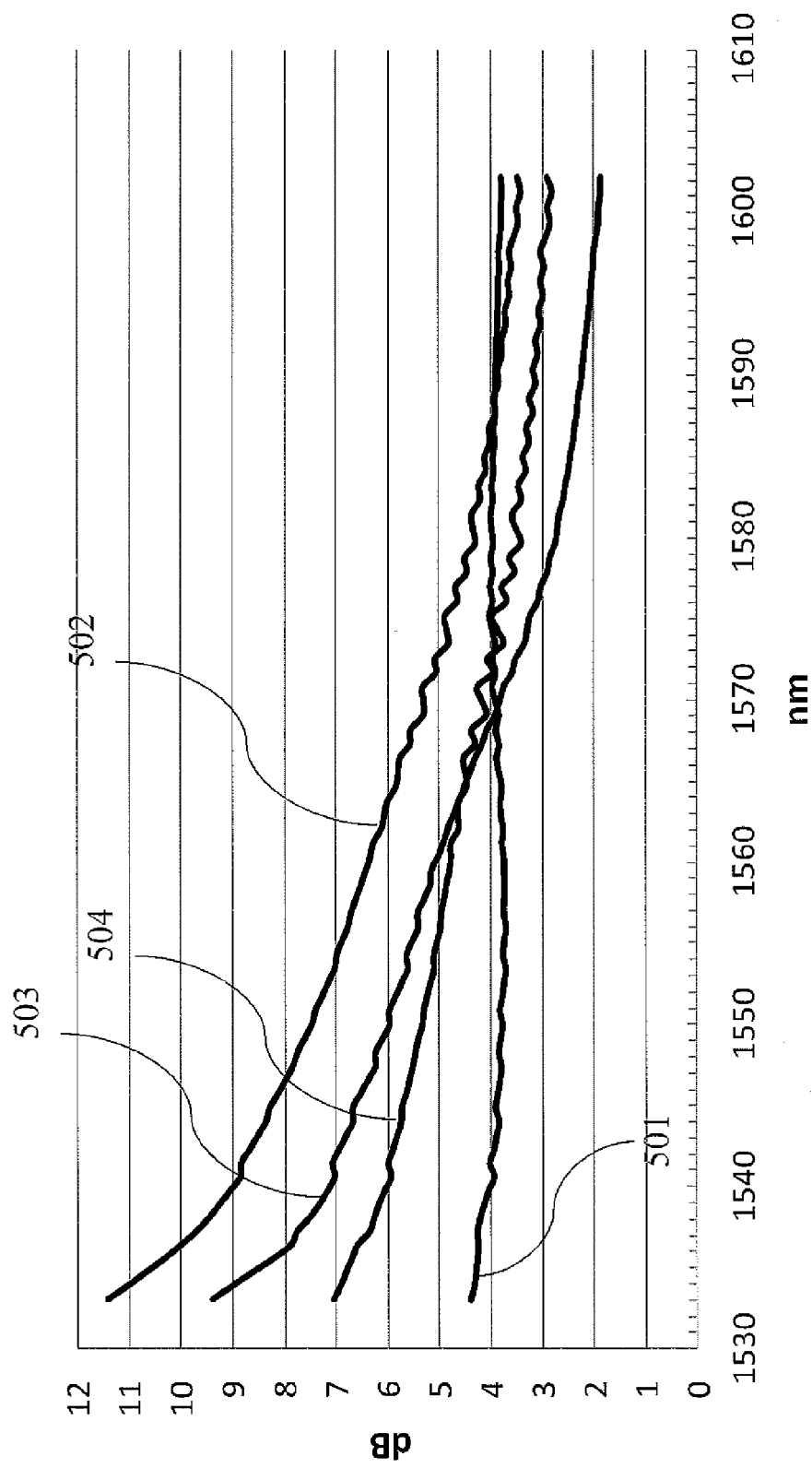
FIG. 5 shows exemplar Noise Figure curves in the erbium doped optical fibers of the optical amplifiers of FIGS. 1 and 2.

With reference now to FIG. 5, curve 501 shows the spectral Noise Figure curve within the WDM band experienced by the WDM reference signal along the first EDF 5 of the optical amplifier 1 and along the first EDF 105 of the comparative optical amplifier 100, the two spectral NF curves being substantially equal. The Noise Figure along the first EDF 5 of the optical amplifier 1 is defined at each wavelength as the ratio (expressed in decibels) of the Signal to Noise Ratio at the input end 5' of the first EDF 5 to the Signal to Noise Ratio at the output end 5" of the first EDF 5 (analogously for the NF along each EDF of amplifiers 1 and 100).

Curve 502 of FIG. 5 shows the spectral NF curve within the WDM band experienced by the WDM reference signal along the second EDF 107 of the comparative optical amplifier 100.

Curves 503 and 504 of FIG. 5 show the spectral NF curve within the WDM band experienced by the WDM reference signal along respectively the second EDF 7 and the third EDF 9 of the optical amplifier 1. It is noted that the spectral NF of the second EDF 7 is higher for C-band but the contribution to the total NF is reduced by the equivalent gain from the Gain of the first EDF 5 and the loss of the 1st GFF 6. It is also noted that the spectral NF of the third EDF 9 is better than the NF of the 2nd EDF with a reduced slope curve exemplarily because rotating around the pivot value (about 4.5 dB) at the wavelength of about 1560 nm. The contribution to total NF is still reduced by the equivalent gain from the 1st, 2nd EDF gain and 1st, 2nd GFF loss.

Figure 7:
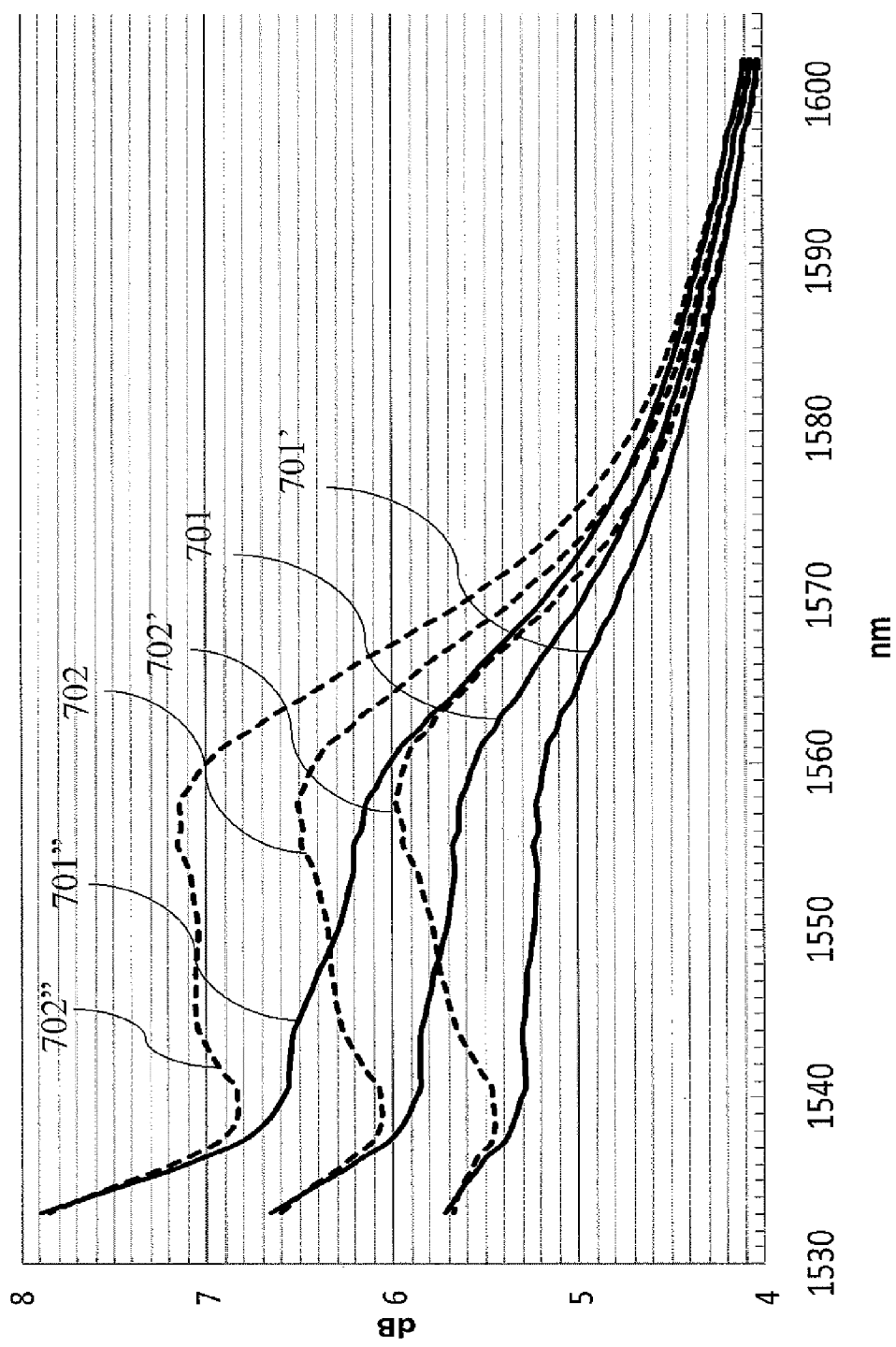
FIG. 7 shows exemplar total Noise Figure curves of the optical amplifiers of FIGS. 1 and 2.

With reference to FIG. 7, curves 701 (solid) and 702 (dashed) show the respective total spectral NF curve within the WDM band experienced by the WDM reference signal along respectively the optical amplifier 1 and the comparative optical amplifier 100, the total NF being defined at each wavelength as the ratio (in dB) of the Signal to Noise Ratio at the input end 3 of the respective optical amplifier to the Signal to Noise Ratio at the output end 4.

It can be noted that, with substantially the same power conversion efficiency, the total spectral NF is reduced significantly (i.e. up to 1 dB) in the optical amplifier 1 of the present invention with respect to the comparative amplifier 100.

In order to assess the robustness of the performances of the optical amplifier of the present invention to variation of the total input optical power of the WDM signal, the Applicant has conducted numerical simulation on the first embodiment of both the optical amplifier 1 and the comparative optical amplifier 100 under the above conditions, but changing the total input power of the WDM signal from the above optimal value of 5 dBm.

With reference to FIG. 6, curves 601' and 602' show the total spectral gain curve within the WDM band experienced by the WDM reference signal along respectively the optical amplifier 1 and the comparative optical amplifier 100 with a total input power of the WDM signal equal to 4 dBm and curves 601" and 602" show the total spectral gain curve within the WDM band experienced by the WDM reference signal along respectively the optical amplifier 1 and the comparative optical amplifier 100 with a total input power of the WDM signal equal to 6 dBm. It can be noted that the total spectral gain tilt is slightly reduced (i.e. about 0.1 dB) in the optical amplifier 1 of the present invention with respect to the comparative amplifier 100.

With reference to FIG. 7, curves 701' and 702' show the total spectral NF curve within the WDM band experienced by the WDM reference signal along respectively the optical amplifier 1 and the comparative optical amplifier 100 with a total input power of the WDM signal equal to 4 dBm and curves 701" and 702" show the total spectral NF curve within the WDM band experienced by the WDM reference signal along respectively the optical amplifier 1 and the comparative optical amplifier 100 with a total input power of the WDM signal equal to 6 dBm. It can be noted the consistently improved performances in terms of NF of the optical amplifier of the present invention.

The Applicant has conducted further numerical simulations on a respective second embodiment of both the optical amplifier 1 and the comparative optical amplifier 100, with the same above choices of components and parameters, but the following ones.

As regard the choice of the first, second and third EDF 5, 7 and 9, they still have a peak absorption around 1530 nm of 8.352 dB/m, however in the second embodiment the first, second and third EDF are respectively 19 m, 3 m and 5.5 m long.

As regard the choice of the first and second EDF 105 and 107, they still have a peak absorption around 1530 nm of 8.352 dB/m, however in the second embodiment the first and second EDF are respectively 19 m and 8.5 m long.

Figure 8:
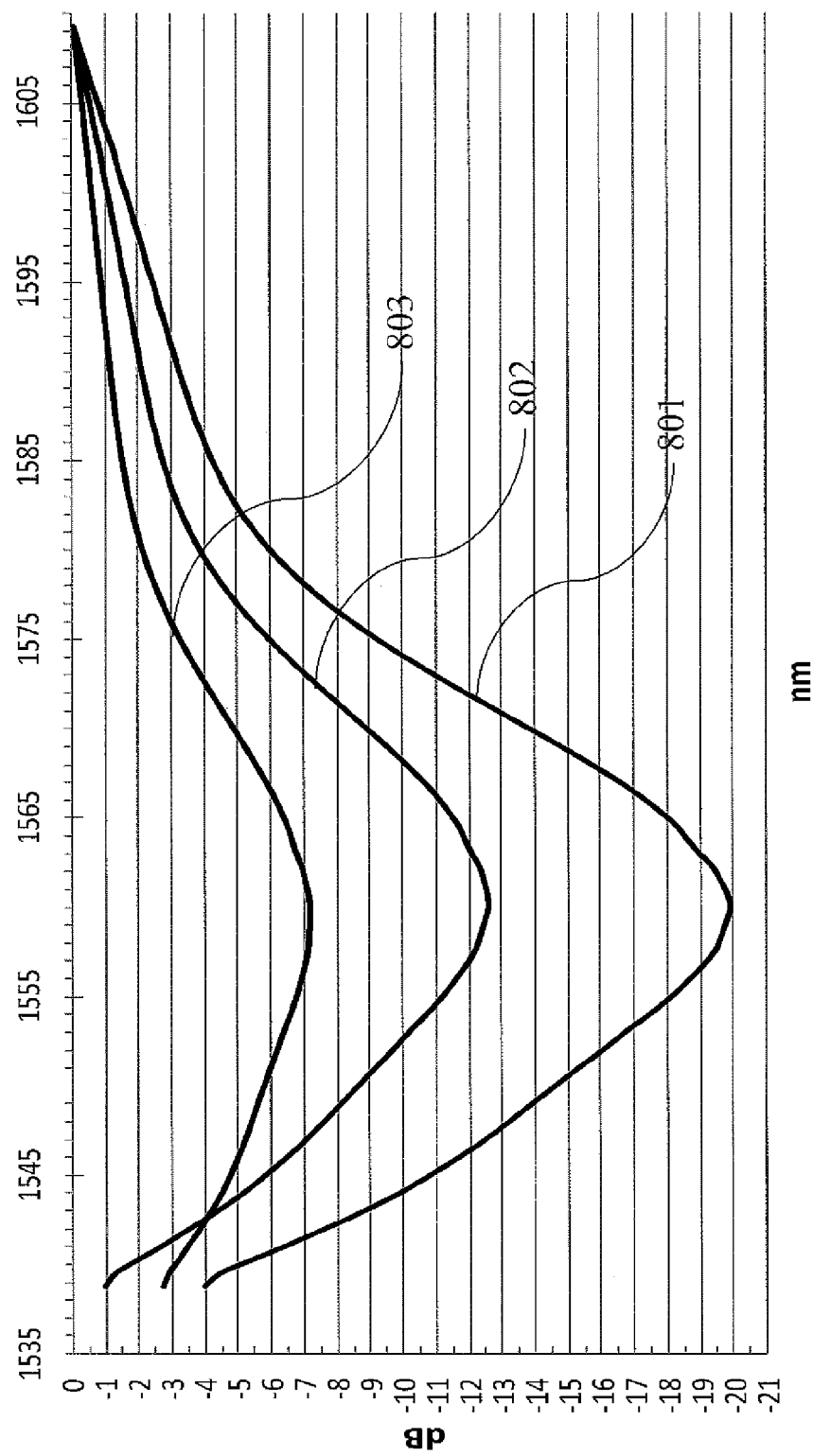
FIG. 8 shows exemplar spectral loss curves of gain flattening filters in a further embodiment of the optical amplifiers of FIGS. 1 and 2.

FIG. 8 shows the spectral loss curve 801 of the GFF 106 of the second embodiment of the optical amplifier 100. FIG. 8 also shows the spectral loss curves of the first GFF 6 (curve 802) and the second GFF 8 (curve 803) of the second embodiment of the optical amplifier 1.

The WDM optical signal (referred to as the second reference WDM optical signal) input in both the simulated second embodiments of the optical amplifier 1 and 100 has 160 channels with equal optical power and equally spaced by 53.5 GHz over a WDM band spanning from 1539.35 nm (lowest wavelength) to 1609.19 nm (highest wavelength), for a total continuous band about 69.8 nm wide.

The total optical power of the second reference WDM signal at the input end 3 of both the optical amplifiers 1 and 100 was taken equal to 4, 5 dBm and 6 dBm (saturated operation).

In the case of the total input power equal to 5 dBm, the total optical power of the WDM signal at the output end 4 of the optical amplifiers 1 and 100 was equal to 18.8 dBm and 18.9 dBm respectively.

For both amplifiers 1 and 100 the optical power of the optical pump radiation emitted by the optical source 12 was taken always equal to 600 mW, with the same splitting ratio of the splitter 16 of 70-30 as in the first embodiment.

Figure 9:
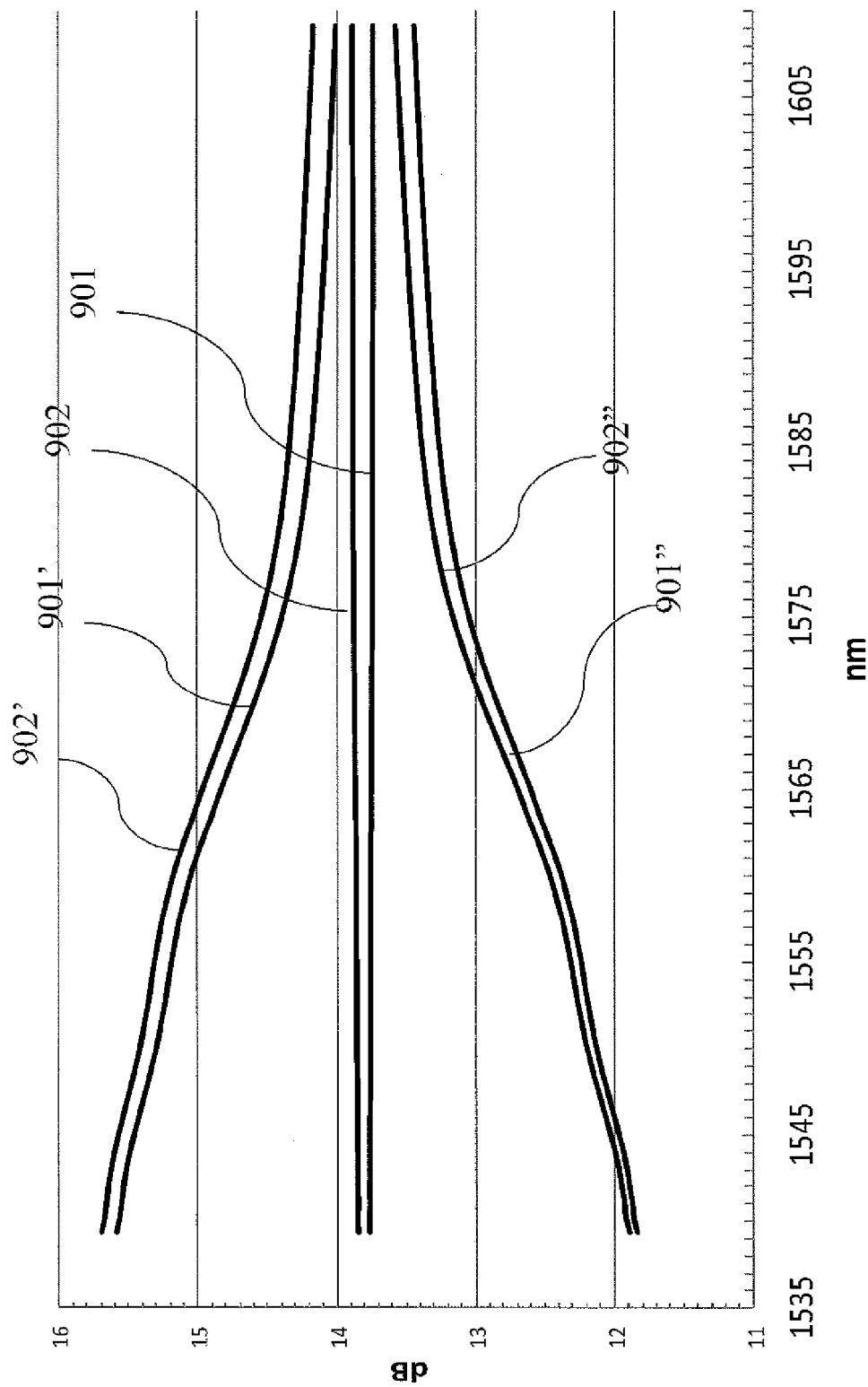
FIG. 9 shows exemplar total gain curves of the further embodiment of the optical amplifiers of FIGS. 1 and 2.
Figure 10:
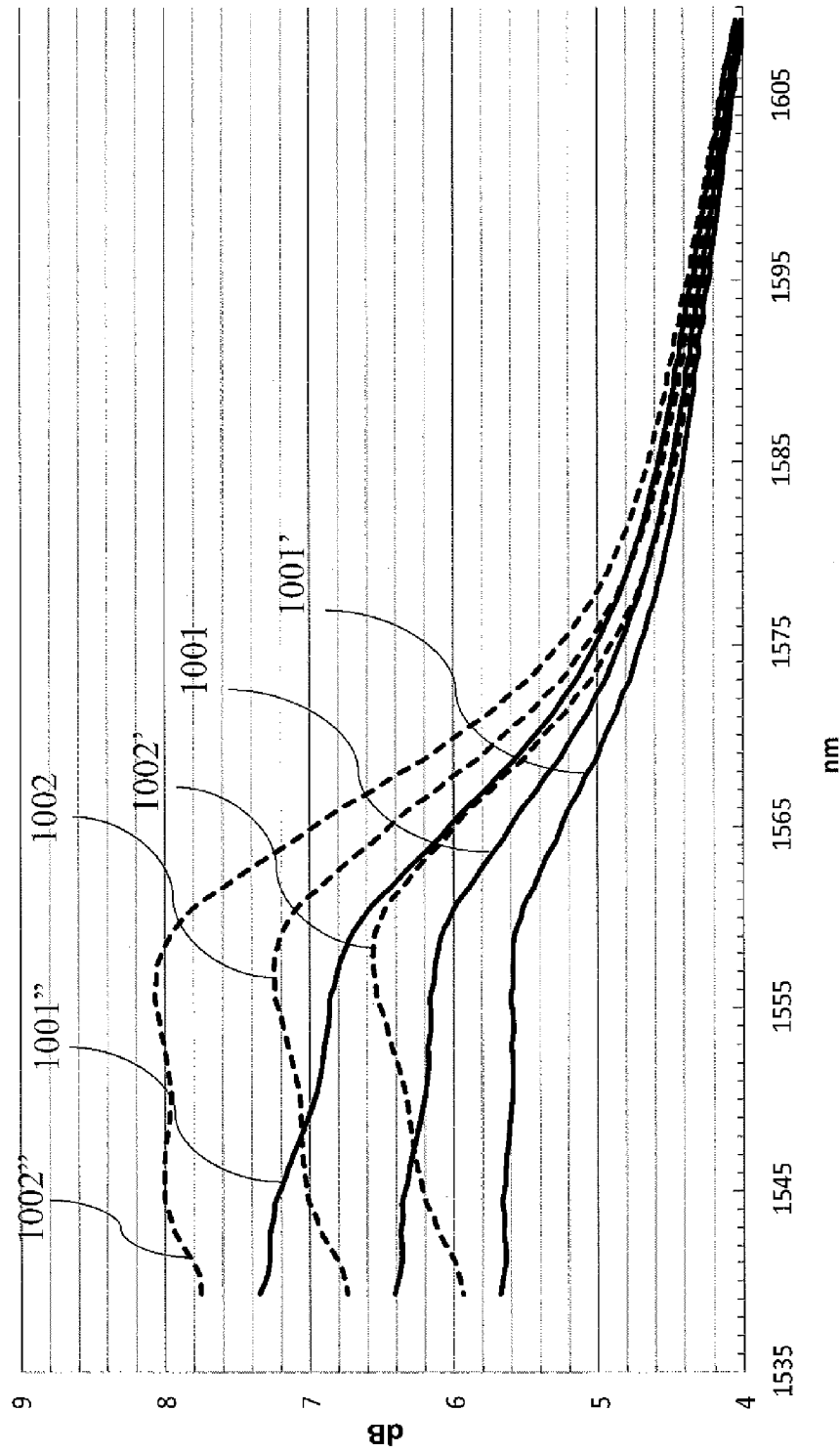
FIG. 10 shows exemplar total Noise Figure curves of the further embodiment of the optical amplifiers of FIGS. 1 and 2.

FIGS. 9 and 10 show the simulated results under the above conditions for the respective second embodiment of both the optical amplifiers 1 and 100.

With reference to FIG. 9, curves 901 and 902 show the respective total spectral gain curve within the WDM band experienced by the WDM reference signal along respectively the optical amplifier 1 and the comparative optical amplifier 100, the two spectral gain curves being substantially equal. It can be noted again the flatness of the gain. Curves 901' and 902' show the total spectral gain curve within the WDM band experienced by the WDM reference signal along respectively the optical amplifier 1 and the comparative optical amplifier 100 with a total input power of the WDM signal equal to 4 dBm and curves 901" and 902" show the total spectral gain curve within the WDM band experienced by the WDM reference signal along respectively the optical amplifier 1 and the comparative optical amplifier 100 with a total input power of the WDM signal equal to 6 dBm. It can be noted that the total spectral gain tilt is reduced in the optical amplifier 1 of the present invention with respect to the comparative amplifier 100.

With reference to FIG. 10, curves 1001 (solid) and 1002 (dashed) show the respective total spectral NF curve within the WDM band experienced by the WDM reference signal along respectively the optical amplifier 1 and the comparative optical amplifier 100, curves 1001' and 1002' show the total spectral NF curve within the WDM band experienced by the WDM reference signal along respectively the optical amplifier 1 and the comparative optical amplifier 100 with a total input power of the WDM signal equal to 4 dBm and curves 1001" and 1002" show the total spectral NF curve within the WDM band experienced by the WDM reference signal along respectively the optical amplifier 1 and the comparative optical amplifier 100 with a total input power of the WDM signal equal to 6 dBm. It can be noted the consistently improved performances in terms of NF of the optical amplifier of the present invention.

The numerical results show that the optical amplifier of the present invention works well with WDM signal in different wavelength bandwidths, up to at least 1610 nm.

The Applicant also notes that the Power Conversion Efficiency (PCE) is around 13%, which is a comparatively high value.

The invention claimed is:

1. An optical amplifier comprising an optical path having an input end and an output end, a direction of propagation for an optical signal being defined which goes from the input end to the output end, a first erbium doped optical fiber placed along the optical path, a first gain flatting filter placed along the optical path downstream the first erbium doped optical fiber, a second erbium doped optical fiber placed along the optical path downstream the first gain flatting filter, a second gain flatting filter placed along the optical path downstream the second erbium doped optical fiber, a third erbium doped optical fiber placed along the optical path downstream the second gain flatting filter, and an optical pump optically coupled to the optical path so as to optically pump at least the first and the third erbium doped optical fiber, wherein each of the first and second pain flattening filters has a spectral loss curve having at a first wavelength comprised between 1555 nm and 1565 nm a first loss, at a second wavelength comprised between 1535 nm and 1545 nm a second loss and at a third wavelength comprised between 1575 nm and 1585 nm a third loss, and wherein the second loss of the first gain flattening filter is greater than, or equal to, −8 dB and the second loss of the second gain flattening filter is greater than, or equal to, −6 dB.

2. The optical amplifier according to claim 1, wherein the first erbium doped optical fiber has a total absorption loss at 1530 nm greater than or equal to 100 dB and smaller than, or equal to, 180 dB and the third erbium doped optical fiber has a total absorption loss at 1530 nm greater than or equal to 20 dB and smaller than, or equal to, 70 dB.

3. The optical amplifier according to claim 1, wherein the second erbium doped optical fiber has a total absorption loss at 1530 nm greater than or equal to 10 dB and smaller than, or equal to, 40 dB.

4. The optical amplifier according to claim 1, wherein the optical pump is configured for inputting an optical pump radiation into an input end of the first erbium doped optical fiber with an optical power greater than, or equal to, 200 mW and smaller than, or equal to, 700 mW.

5. The optical amplifier according to claim 1, wherein the optical pump is configured for inputting an optical pump radiation into an output end of the third erbium doped optical fiber with an optical power greater than, or equal to, 50 mW, and smaller than, or equal to, 400 mW.

6. The optical amplifier according to claim 1, wherein the optical pump is configured for inputting an optical pump radiation into an output end of the second erbium doped optical fiber with an optical power smaller than, or equal to, 150 mW.

7. The optical amplifier according to claim 1, wherein the optical pump is configured for inputting an optical pump radiation into the first erbium doped optical fiber co-propagating with the direction of propagation and into the third and second erbium doped optical fiber counter-propagating with respect to the direction of propagation.

8. The optical amplifier according to claim 1, wherein the optical pump comprises an optical source configured for emitting an optical pump radiation at a pump wavelength, and a driver configured for driving the optical source, wherein the optical source and the driver are configured so that the emitted optical pump radiation has an optical power greater than, or equal to, 300 mW, and smaller than, or equal to, 1000 mW, and wherein the optical pump comprises a first optical coupler placed along the optical path upstream the first erbium doped optical fiber and configured for coupling the optical source to the optical path so that the optical pump radiation is co-propagating with the direction of propagation, a second optical coupler placed along the optical path downstream the third erbium doped optical fiber and configured for coupling the optical source to the optical path so that the optical pump radiation is counter-propagating to the direction of propagation, and an optical splitter having an input port optically connected to the optical source and a first and a second output port optically connected to respectively the first and the second optical coupler, so as to optically connect the optical source to both the first and the second optical coupler, and wherein the optical splitter is configured so that at the pump wavelength the percentage of the optical power output from the first output port to the optical power input to the input port is greater than, or equal to 50% and smaller than, or equal to 90%.

9. The optical amplifier according to claim 1, wherein the first loss of the first gain flattening filter is greater than, or equal to, −16 dB and smaller than, or equal to, −8 dB, wherein the third loss of the first gain flattening filter is greater than, or equal to, −8 dB, and wherein the difference in dB between the second loss and the third loss of the first gain flattening filter is, in absolute value, smaller than, or equal to, 6 dB.

10. The optical amplifier according to claim 1, wherein the first loss of the second gain flattening filter is greater than, or equal to, −10 dB, and smaller than, or equal to, −3 dB, wherein the third loss of the second gain flattening filter is greater than, or equal to, −6 dB, and wherein the difference in dB between the second loss and the third loss of the second gain flattening filter is, in absolute value, smaller than, or equal to, 4 dB.

11. The optical amplifier according to claim 1, wherein it is defined a first, second and third gain as the ratio of an optical signal power at an output end of, respectively, the first, second and third erbium doped optical fiber to an optical signal power at an input end of respectively, the first, second and third erbium doped optical fiber, wherein the first, second and third erbium doped optical fiber and the optical pump are configured so that, when a reference WDM signal is input to the input end of the optical amplifier with a total input power of 5 dBm, the reference WDM signal having a number of channels comprised between 80 and 200 channels equally spaced within a continuous WDM band having bandwidth comprised between 40 nm and 70 nm and comprising the wavelengths of 1540 nm and 1580 nm, all the channels having the same optical power, the first gain at a first wavelength comprised between 1555 nm and 1565 nm is greater than, or equal to, 16 dB, and smaller than 30 dB, the first gain at a second wavelength comprised between 1535 nm and 1545 nm and at a third wavelength comprised between 1575 nm and 1585 nm is greater than, or equal to, 6 dB, and smaller than 18 dB, the difference in dB between the first gain at the second and third wavelength is, in absolute value, smaller than or equal to 6 dB, the difference in dB between the first gain at the first wavelength and the first gain at the second wavelength and/or at the third wavelength is greater than or equal to 5 dB, the second gain at the second wavelength is smaller than 0 dB, the second gain at the first and third wavelength is greater than 0 dB, the second gain at the first, second and third wavelength is smaller, in absolute value, than 4 dB, the third gain at the first and second wavelength is greater than, or equal to, 4 dB, and smaller than, or equal to 14 dB, the third gain at the third wavelength is greater than, or equal to, 0 dB, and smaller than, or equal to 9 dB, and the difference, in dB, of the third gain at the first and second wavelength is smaller, in absolute value, than 3 dB.

12. A WDM optical communication system comprising an optical fiber communication link comprising therealong at least one optical amplifier (1) according to claim 1, a WDM transmitter structured for generating and launching into the optical fiber communication link with said direction of propagation a WDM optical signal, and a WDM receiver structured for receiving and processing a WDM optical signal coming from the optical fiber communication link.

13. A method for optically amplifying a WDM optical signal comprising:
inputting the WDM optical signal into an input end of an optical amplifier comprising an optical path having the input end and an output end, the WDM optical signal propagating along a direction of propagation going from the input end to the output end, a first erbium doped optical fiber placed along the optical path, a first gain flatting filter placed along the optical path downstream the first erbium doped optical fiber, a second erbium doped optical fiber placed along the optical path downstream the first gain flatting filter, a second gain flatting filter placed along the optical path downstream the second erbium doped optical fiber, a third erbium doped optical fiber placed along the optical path downstream the second gain flatting filter, and an optical pump optically coupled to the optical path, wherein each of the first and second gain flattening filters has a spectral loss curve having at a first wavelength comprised between 1555 nm and 1565 nm a first loss, at a second wavelength comprised between 1535 nm and 1545 nm a second loss and at a third wavelength comprised between 1575 nm and 1585 nm a third loss and wherein the second loss of the first gain flattening filter is greater than, or equal to, −8 dB and the second loss of the second gain flattening filter is greater than, or equal to, −6 dB;
sending by the optical pump an optical pump radiation into the optical path so as to optically pump at least the first and the third erbium doped optical fiber and therein amplify the WDM signal;
outputting the amplified WDM optical signal from the output end of the optical amplifier, wherein the WDM optical signal comprises a plurality of optical signal channels having spaced wavelengths, the difference between the highest and the lowest wavelength of the WDM optical signal being greater than 40 nm, and wherein the highest and the lowest wavelength of the WDM optical signal are at opposite sides of the wavelength of 1565 nm.

14. The method according to claim 13, wherein the optical pump radiation has an optical power in at least a point of the first erbium doped optical fiber greater than, or equal to, 200 mW, and smaller than, or equal to, 700 mW, and an optical power in at least a point of the third erbium doped optical fiber greater than, or equal to, 50 mW, and smaller than, or equal to, 400 mW, and an optical power in at least a point of the second erbium doped optical fiber smaller than, or equal to, 150 mW.

15. The method according to claim 13, wherein it is defined a first, second and third gain as the ratio of an optical signal power at an output end of, respectively, the first, second and third erbium doped optical fiber to an optical signal power at an input end of respectively, the first, second and third erbium doped optical fiber, wherein the first gain at a first wavelength comprised between 1555 nm and 1565 nm is greater than, or equal to, 16 dB, and smaller than 30 dB, wherein the first gain at a second wavelength comprised between 1535 nm and 1545 nm and at a third wavelength comprised between 1575 nm and 1585 nm is greater than, or equal to, 6 dB, and smaller than 18 dB, wherein the difference in dB between the first gain at the second and third wavelength is, in absolute value, smaller than or equal to 6 dB, and wherein the difference in dB between the first gain at the first wavelength and the first gain at the second and at the third wavelength is greater than or equal to 5 dB.

16. The method according to claim 13, wherein the second gain at the second wavelength is smaller than 0 dB, the second gain at the first and third wavelength is greater than 0 dB, the second gain at the first, second and third wavelength is smaller, in absolute value, than 4 dB, the third gain at the first and second wavelength is greater than, or equal to, 4 dB, and smaller than, or equal to 14 db, the third gain at the third wavelength is greater than, or equal to, 0 dB, and smaller than, or equal to 9 db, and the difference, in dB, of the third gain at the first and second wavelength is smaller, in absolute value, than 3 dB.

* * * * *